(12) United States Patent
Stafford

(10) Patent No.: US 6,832,671 B1
(45) Date of Patent: Dec. 21, 2004

(54) TORQUE CONVERTER CLUTCH APPLY VALVE

(75) Inventor: Maura Jane Stafford, Grayslake, IL (US)

(73) Assignee: Sonnax Industries, Inc., Bellows Falls, VT (US)

( * ) Notice: Subject to any disclaimer, the term of this patent is extended or adjusted under 35 U.S.C. 154(b) by 0 days.

(21) Appl. No.: 10/187,092

(22) Filed: Jul. 2, 2002

Related U.S. Application Data

(60) Provisional application No. 60/311,704, filed on Aug. 10, 2001.

(51) Int. Cl.[7] .............................. F16H 61/14; F16J 9/08
(52) U.S. Cl. ...................... 192/3.29; 29/401.1; 192/3.3; 192/85 R; 277/434
(58) Field of Search ................................ 277/434, 470, 277/467, 457, 449, 512, 605, 581, 927, 460, 401, 558; 192/3.28, 3.29, 3.3, 3.31, 85 R, 85 AA; 137/384, 248; 251/214, 332; 29/401.1, 402.01, 402.02

(56) References Cited

U.S. PATENT DOCUMENTS

| | | | | |
|---|---|---|---|---|
| 2,180,347 A | * | 11/1939 | Bohuslav | 277/449 |
| 2,749,195 A | * | 6/1956 | Kruger | 277/449 |
| 3,085,515 A | * | 4/1963 | Workman | 277/449 |
| 3,303,658 A | * | 2/1967 | Chellis | 277/457 |
| 4,403,922 A | * | 9/1983 | Roeder | 277/449 |
| 4,474,106 A | * | 10/1984 | Durenec | 277/449 |
| 4,840,379 A | * | 6/1989 | Thoman, Jr. | 277/584 |
| 4,844,481 A | * | 7/1989 | Marchadour | 277/470 |
| 4,878,519 A | * | 11/1989 | Berding et al. | 277/457 |
| 5,131,666 A | * | 7/1992 | Hutchens | 277/523 |
| 5,964,378 A | * | 10/1999 | Sperry et al. | 222/145.2 |

* cited by examiner

Primary Examiner—Rodney H. Bonck
(74) Attorney, Agent, or Firm—Clifford F. Rey

(57) ABSTRACT

A replacement torque converter clutch (TCC) apply valve for regulating the application of the torque converter clutch within an automatic transmission is disclosed. The TCC apply valve includes a valve piston having an expandable seal installed thereon at the primary wear location within a mating bore in the valve body to reduce hydraulic leakage. The valve piston also includes an internal fluid gallery formed therein in fluid communication with an annular groove wherein the expandable seal resides. Whenever the present TCC apply valve is actuated, TCC signal pressure enters the fluid gallery in the valve piston under pressure and simultaneously urges the expandable seal in a radially outward direction into contact with the mating bore to minimize hydraulic fluid leakage during the apply cycle of the torque converter clutch.

22 Claims, 6 Drawing Sheets

TORQUE CONVERTER CLUTCH APPLY VALVE

CROSS-REFERENCE TO RELATED APPLICATION

This patent application claims the benefit under 35 U.S.C. 119(e) of U.S. Provisional Patent Application No. 60/311,704 filed Aug. 10, 2001, entitled Torque Converter Clutch Apply Valve.

BACKGROUND OF INVENTION

The present invention relates generally to the field of hydraulic circuits within an automatic transmission and, more particularly, to a Torque Converter Clutch (hereinafter "TCC") Apply Valve for General Motors 4T60-E and other similar transmissions that directs torque converter fluid pressure to the TCC apply and release circuits to actuate the torque converter clutch.

Automatic transmission systems of the prior art have a hydraulic circuit subsystem which includes at least a hydraulic pump, a valve body having fluid conducting passageways or circuits, input and exhaust ports formed within the fluid circuits, and a plurality of "spool" valves so-called because of their resemblance to sewing thread spools. Such spool valves are comprised of modified, cylindrical pistons which alternately open and close fluid ports within the valve body to regulate the flow and pressure of automatic transmission fluid (hereinafter "ATF") within the fluid circuits to actuate different components of the transmission. It will be understood that in describing hydraulic fluid circuits, ATF usually changes names when it passes through an orifice or control valve in a specific circuit.

ATF leakage within the TCC apply and release circuits occurs due to the constant oscillation and abrasive action of the steel TCC apply valve within the mating bore of the aluminum valve body, which results in a loss of converter apply pressure. The loss of pressure in the apply circuit causes TCC slippage, converter shudder, and eventually an overheated and/or burned torque converter. Thus, the present invention has been developed to resolve these problems and other shortcomings of the prior art.

SUMMARY OF THE INVENTION

Accordingly, the present invention provides a replacement TCC Apply Valve including an apply valve piston having an expandable seal fabricated from polytetrafluoroethylene (hereinafter "PTFE") i.e. Teflon® or other similar material installed thereon at the primary wear location within the valve body to reduce ATF leakage. The present valve piston also includes an internal ATF gallery with radially extending passages formed therein in fluid communication with an annular groove wherein the expandable seal resides. Whenever the present TCC Apply Valve is actuated by the TCC solenoid, TCC signal pressure forces ATF into the gallery in the apply valve piston and further urges the seal radially outward into contact with the bore to minimize ATF leakage during the apply cycle of the torque converter clutch.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

BRIEF DESCRIPTION OF THE DRAWINGS

The novel features of the present invention are set forth in the appended claim. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENT

Figure 1:
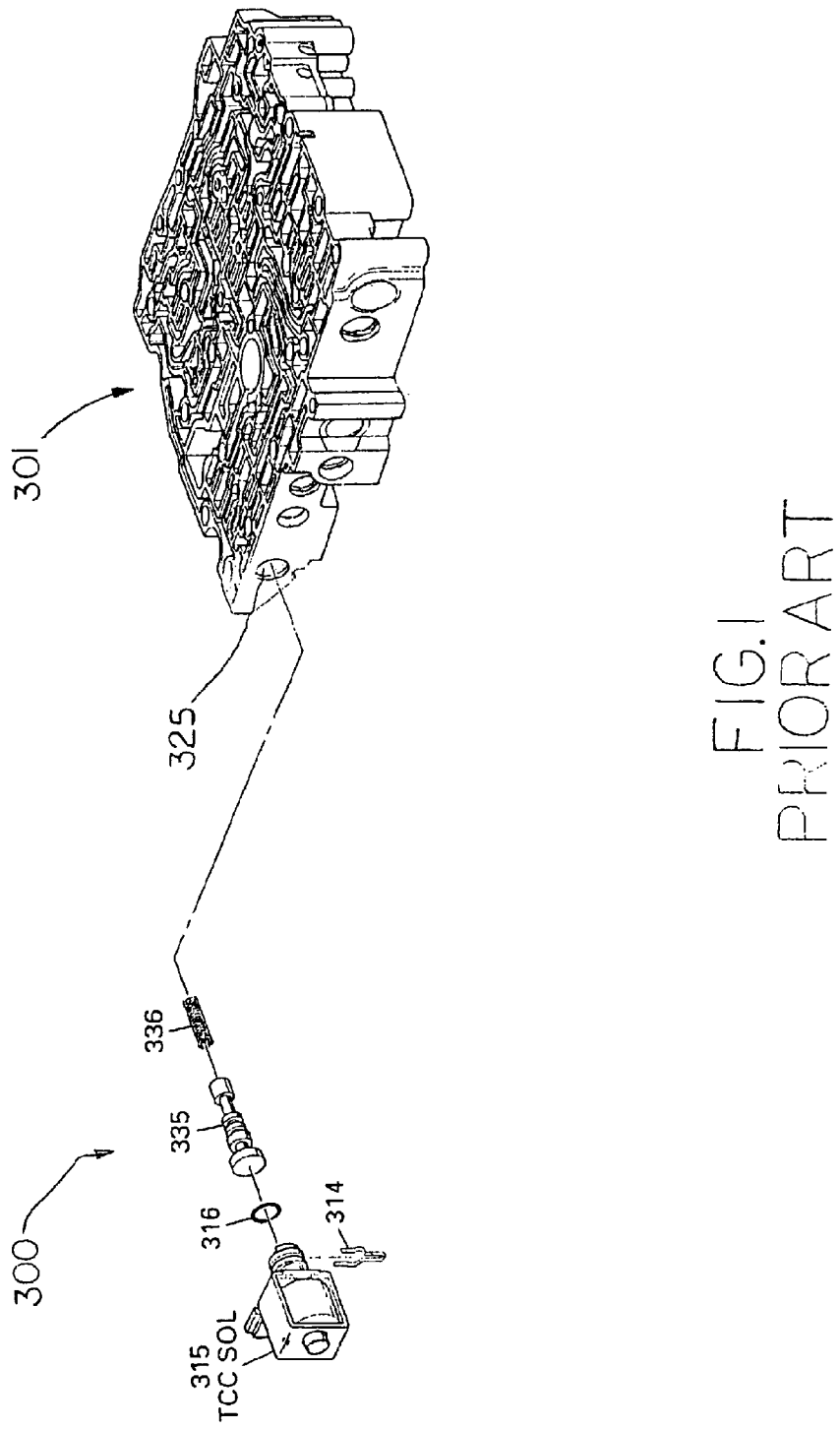
FIG. 1 is an exploded perspective view of the TCC Apply Valve shown with the valve body of the General Motors 4T60E transmission and labeled Prior Art.

With reference to the drawings there is shown therein a TCC apply valve of the prior art, indicated generally at 300, and illustrated in FIG. 1. In the prior art the TCC apply valve 300 is a spool-type valve comprising an elongated, cylindrical piston 335 having a plurality of control lands and a compression spring 336.

The TCC apply valve 300 operates in conjunction with the TCC solenoid 315, which includes an O-ring seal 316. The TCC solenoid 315 is an ON/OFF type solenoid that receives its voltage supply through the ignition switch when the Power Control Module (PCM) provides the ground. When the TCC solenoid 315 is de-energized or OFF, TCC signal fluid is exhausted through the solenoid. When the TCC solenoid 315 is energized or ON, its exhaust port closes allowing TCC signal circuit pressure to move the TCC regulator apply valve 300 against spring force and line pressure.

Figure 2:
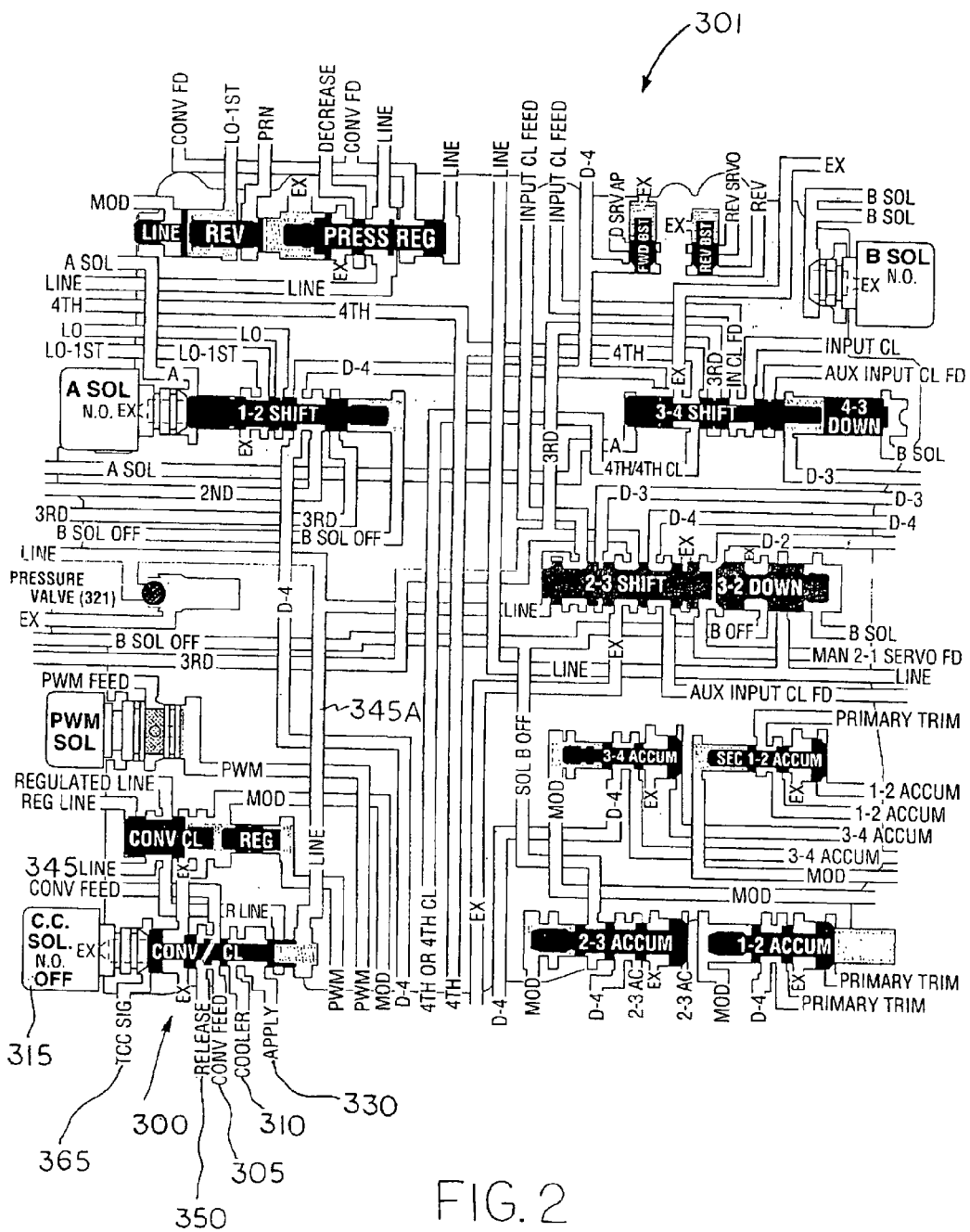
FIG. 2 is a diagrammatic view of the valve body of the General Motors 4T60E transmission and labeled Prior Art showing the TCC Apply Valve in its functional position.

Referring to FIG. 2 there is shown a diagrammatic view of the valve body, indicated generally at 301, wherein the TCC apply valve 300 is located as illustrated. When the TCC solenoid is OFF, the TCC apply valve 300 is held in the position shown in FIG. 2 by spring force and line pressure at 345A. In this position converter feed pressure at 305 enters the torque converter clutch release circuit at 350 and apply fluid flows around the valve and into the cooler circuit at 310. With the TCC solenoid 315 ON, TCC signal fluid moves the valve against line pressure and spring force. When actuated (i.e. stroked to the right in FIG. 2), it directs regulated line pressure at 345 into the apply circuit at 330.

Leakage can eventually develop within the TCC apply circuit 330 as the result of mechanical wear and the 4T60E transmission may exhibit torque converter shudder, a burned torque converter, clutch failure and/or related diagnostic codes. Often such problems are caused by the abrasive action of the original equipment manufacture (hereinafter "OEM") TCC apply valve 300 which is fabricated from hardened steel material wearing against the aluminum valve body 301. The result is loss of hydraulic pressure within the TCC apply circuit requiring costly replacement of the valve body 301.

Figure 3:
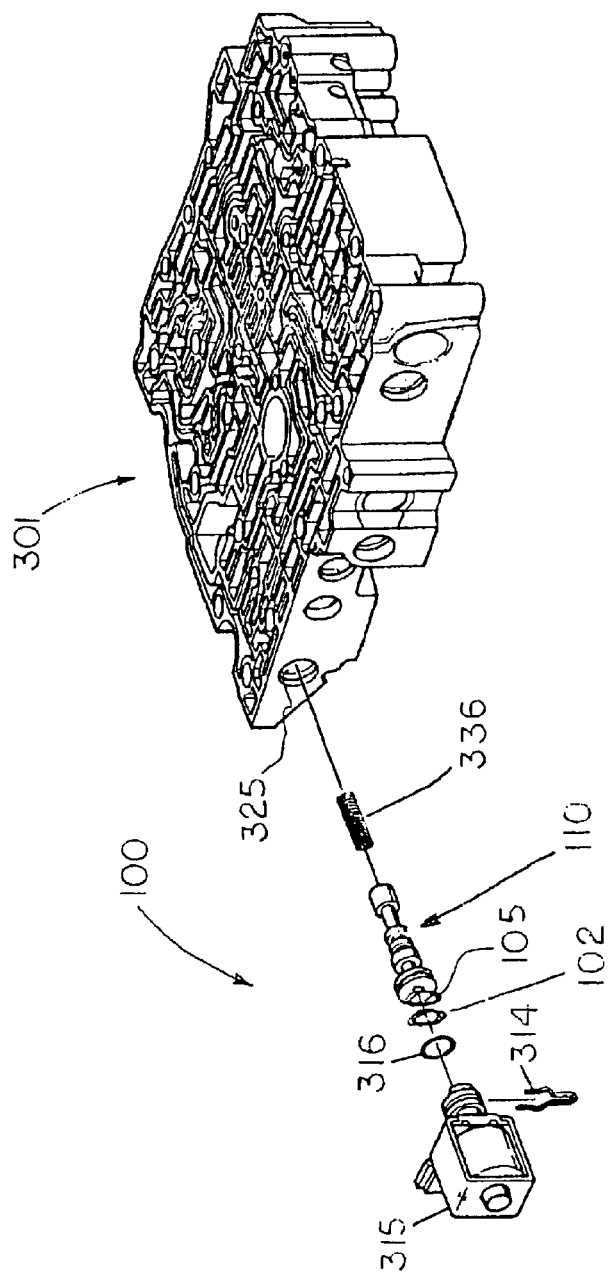
FIG. 3 is an exploded perspective view of the TCC Apply Valve of the present invention shown with the valve body of the General Motors 4T60E transmission.

Accordingly, the replacement TCC Apply Valve of the present invention provides a solution to this problem and will now be described. Referring to FIG. 3 there is shown therein a replacement TCC Apply Valve assembly in accordance with the present invention, indicated generally at 100. The present TCC Apply Valve assembly 100 includes a valve piston, indicated generally at 110, having an expandable (PTFE) i.e. Teflon® seal 102 or other similar seal, which is disposed in the principal wear location within the bore 325 to prevent ATF leakage. The seal 102 may include an optional expander spring 105 disposed in concentric relation and residing interior of the seal.

Figure 4:
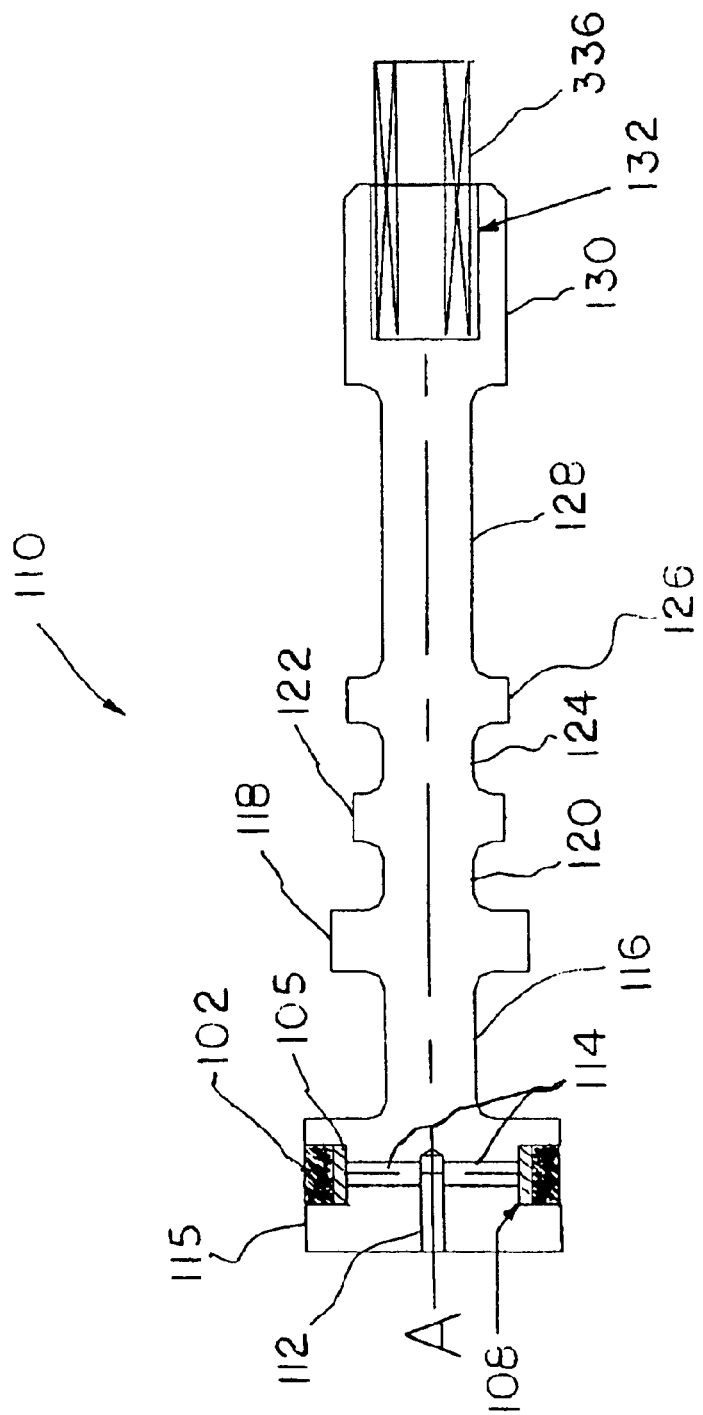
FIG. 4 is a longitudinal cross-section of the present TCC apply valve piston.
Figure 6A:
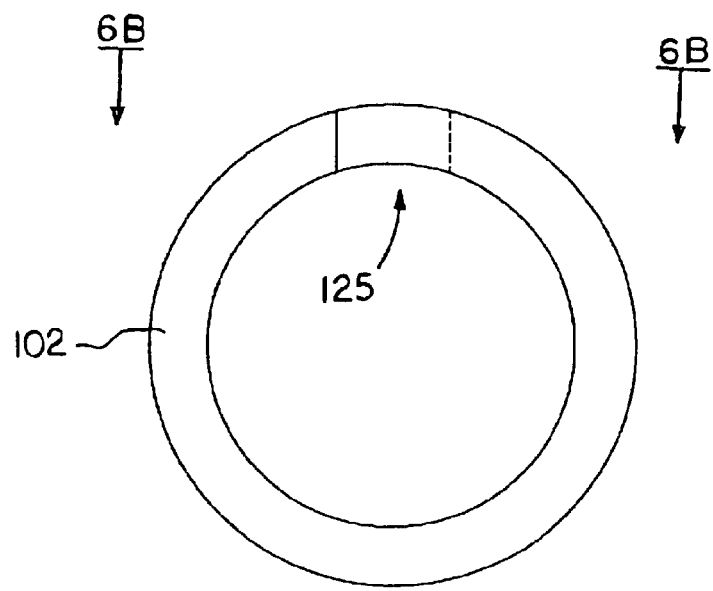
FIG. 6A is an enlarged side view of the expandable seal illustrating the scarf cut.
Figure 6B:
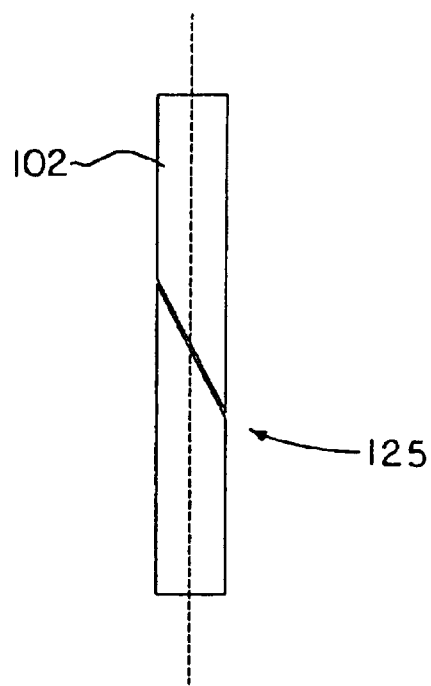
FIG. 6B is a plan view taken along the line 6B—6B of FIG. 6A illustrating the angular orientation of the scarf cut in relation to the mid-circumferential plane of the seal.

FIG. 4 illustrates the present valve piston 110 showing the structural features thereof in further detail. The valve piston 110 provides structures and features comprising expandable sealing means including, but not limited to, the following structures. Valve piston 110 includes a primary control land 115 wherein an annular seal groove 108 is formed to a sufficient depth to receive the expandable seal 102. The seal 102 is generally rectangular in cross-section being scarf cut (i.e. cut at an oblique angle to the mid-circumferential plane) as at 125 shown in FIGS. 6A and 6B to facilitate its radial expansion during operation. The optional expander spring 105 serves to support the seal 102 in a static (i.e. release) condition to minimize ATF leakage from the TCC apply circuit.

In addition, the valve piston 110 is provided with an internal ATF gallery to lubricate and expand the seal 102 including an axial ATF passage 112 formed along the longitudinal axis -A- to a predetermined depth and communicating with at least one radial passage 114, which is disposed in fluid communication with the seal groove 108. During the apply cycle TCC signal pressure enters the passage 112 as shown by directional arrows 370 (FIG. 5), flows through passage 114, and into seal groove 108 to urge the seal 102 in a radially outward direction to maintain contact with the bore 325 thereby preventing fluid pressure loss during the TCC apply cycle.

Figure 5:
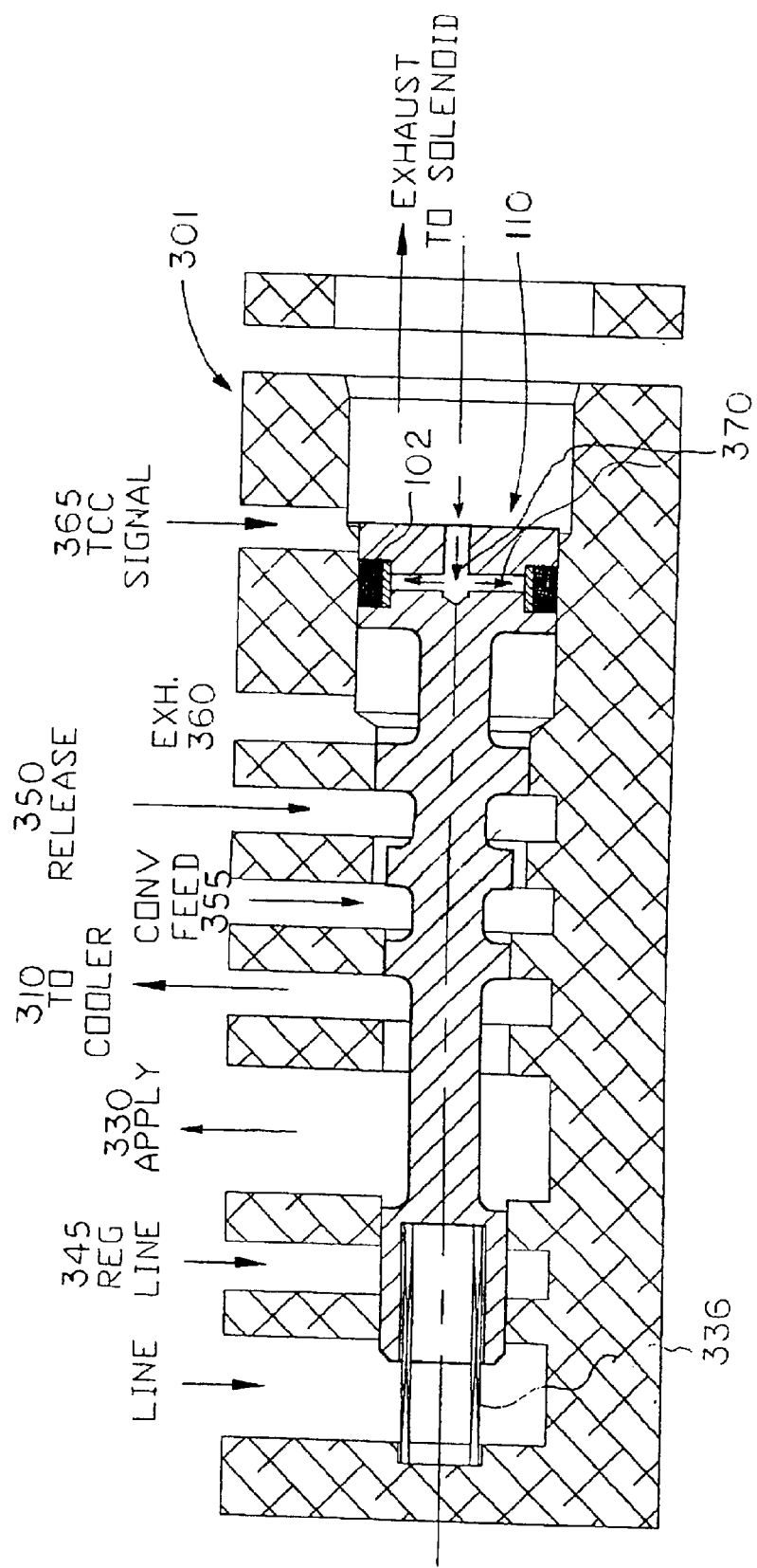
FIG. 5 is an enlarged longitudinal cross-section showing the present TCC Apply Valve within the valve body of the transmission.

As most clearly shown in FIG. 4, a coaxial relief diameter 116 integrally connects primary control land 115 to a second control land 118, which regulates ATF flow to the release circuit 350 (FIG. 5). A coaxial relief diameter 120 integrally connects to a second control land 122. A coaxial relief diameter 124 integrally connects second control land 122 to a third control land 126, which controls ATF flow to the cooler circuit 310 (FIG. 5). A coaxial relief diameter 128 integrally connects control land 126 to a fourth control land 130. The fourth control land 130 includes a spring pocket 132 wherein the compression spring 336 is seated.

In operation when the TCC solenoid is OFF, the present TCC apply valve piston 110 is biased to the release position shown in FIG. 5 by spring force and line pressure. In this position converter feed pressure enters the torque converter clutch release circuit 350 and apply fluid flows around the valve piston 110 and into the cooler circuit 310 as shown. Alternatively, when the TCC solenoid is ON, TCC signal pressure at 365 moves the valve piston 110 against line pressure and spring force. When the valve piston 10 is actuated (i.e. stroked to the left from the position in FIG. 5), it directs regulated line pressure at 345 into the apply circuit 330, converter feed fluid at 355 into the cooler circuit 310, and passes converter release fluid at 350 to exhaust at 360. Simultaneously, TCC signal pressure at 365 enters the ATF passages 112, 114 and flows under pressure to expand the seal 102 in a radially outward direction to provide an optimal seal with the bore 325 during the apply cycle.

In an installation procedure for the present replacement TCC Apply Valve 100, the OEM valve 300 and compression spring 336 are initially removed from the valve body 301. The OEM valve 300 is discarded, but the original spring 336 is retained. In some applications a new spring 336 having a higher spring rate may be preferable. Next, a lubricant is applied to the seal groove 108 on the replacement valve piston 110 and the optional expander spring 105 and/or the seal 102 are installed in the groove 108 such that the outer surface of the seal 102 is not raised above the surface of control land 115 (FIG. 4). Thereafter, the OEM compression spring 336 is inserted into the spring pocket 132 formed within control land 130. Next, the assembled valve 100 and spring 336 are carefully pushed into the valve bore 325 with the spring end first as seen in FIG. 5.

It is important that the seal 102 remains fully seated in the seal groove 108 as it is pushed past the open ports in the valve body 301 during installation. Next, the TCC solenoid 315 including O-ring seal 316 and retaining clip 314 (FIG. 1) are reinstalled. Thereafter, using a small screwdriver or other suitable tool, carefully slide the replacement TCC Apply Valve 100 in the bore 325 to ensure that the present valve has not become jammed during installation.

It can be seen that the present invention provides a TCC Apply Valve that utilizes an expandable seal fabricated from Teflon® or other similar material, which is installed thereon in the primary wear area of the valve body to prevent a loss of regulated line pressure within the TCC apply circuit. The seal groove wherein the seal resides is in fluid communication with the TCC signal circuit via an internal ATF gallery formed within the apply valve piston. Thus, when the present TCC apply valve is actuated by TCC signal circuit pressure, the seal is simultaneously expanded to seal the apply circuit to maximize ATF pressure to the torque converter clutch during the apply cycle.

Although not specifically illustrated in the drawings, it should be understood that additional equipment and structural components will be provided as necessary and that all of the components described above are arranged and supported in an appropriate fashion to form a complete and operative valve mechanism incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claim be construed broadly and in a manner consistent with the scope of invention.

What is claimed is:

1. A torque converter clutch apply valve for use in combination with the valve body of a transmission, said apply valve regulating application of the torque converter clutch responsive to fluid pressure in the torque converter clutch signal circuit, said apply valve comprising:

an apply valve piston having at least one annular seal groove formed therein, said valve piston further including an internal fluid gallery formed in fluid communication with said seal groove and with the torque converter clutch signal circuit; and an expandable seal disposed within said seal groove such that said seal is urged radially outward by fluid pressure delivered through said internal fluid gallery from the torque converter clutch signal circuit simultaneously with the application of the torque converter clutch.

2. A torque converter clutch apply valve of claim 1 wherein said internal fluid gallery comprises a longitudinally oriented fluid passage formed in fluid communication with at least one radially oriented fluid passage extending to said seal groove.

3. A torque converter clutch apply valve of claim 1 wherein said expandable seal is fabricated from polytetrafluoroethylene material.

4. A torque converter clutch apply valve of claim 3 wherein said expandable seal is rectangular in cross-section.

5. A torque converter clutch apply valve of claim 4 wherein said expandable seal is scarf cut at an oblique angle to the mid-circumferential plane thereof to facilitate installation within said seal groove and expansion of said seal during the apply cycle.

6. A torque converter clutch apply valve for use within the valve body of an automatic transmission, said apply valve being responsive to torque converter clutch signal pressure for application and release of the torque converter clutch, said apply valve comprising:

an apply valve piston including a primary control land, wherein said primary control land includes at least one annular seal groove formed therein;

a wear-resistant seal disposed within said seal groove; and seal expanding means disposed on said valve piston such that said seal is expandable responsive to torque converter clutch signal pressure simultaneously with the apply cycle of said valve.

7. A torque converter clutch apply valve of claim 6 wherein said seal expanding means includes an expander spring disposed within said seal groove in coaxial relation to said wear-resistant seal to expand said seal in a static condition.

8. A torque converter clutch apply valve of claim 6 wherein said seal expanding means includes an internal fluid gallery formed within said valve piston in fluid communication with said seal groove such that said seal is urged in a radially outward direction by fluid pressure delivered through said internal fluid gallery simultaneously with the apply cycle of said valve.

9. A torque converter clutch apply valve of claim 8 wherein said internal fluid gallery comprises a longitudinally oriented fluid passage formed in fluid communication with at least one radially oriented fluid passage extending to said seal groove.

10. A torque converter clutch apply valve of claim 6 wherein said seal is fabricated from polytetrafluoroethylene material.

11. A torque converter clutch apply valve of claim 10 wherein said seal is rectangular in cross-section.

12. A torque converter clutch apply valve of claim 11 wherein said seal is scarf cut at an oblique angle to the mid-circumferential plane thereof to facilitate installation within said groove and expansion of said seal during application of the torque converter clutch.

13. An improved torque converter clutch apply valve for use in combination with the valve body of a transmission, said apply valve regulating application of the torque converter clutch responsive to pressure level changes in the torque converter clutch signal circuit, the improvements comprising:

an apply valve piston having at least one annular seal groove formed therein, said valve piston further including an internal fluid gallery in fluid communication with said seal groove and with the torque converter clutch signal circuit; and an expandable seal disposed within said at least one annular seal groove such that said seal is urged radially outward by fluid pressure delivered through said internal fluid gallery from the torque converter clutch signal circuit simultaneously with the application of the torque converter clutch.

14. A torque converter clutch apply valve of claim 13 wherein said internal fluid gallery comprises a longitudinally oriented fluid passage formed in fluid communication with at least one radially oriented fluid passage extending to said seal groove.

15. A torque converter clutch apply valve of claim 13 wherein said expandable seal is fabricated from polytetrafluoroethylene material.

16. A torque converter clutch apply valve of claim 15 wherein said expandable seal is rectangular in cross-section.

17. A torque converter clutch apply valve of claim 16 wherein said expandable seal is scarf cut at an oblique angle to the mid-circumferential plane thereof to facilitate installation within said seal groove and expansion of said seal during the apply cycle.

18. An improved automatic transmission for a motor vehicle wherein a torque converter clutch apply valve is disposed in fluid communication with the torque converter clutch via the clutch apply circuit, said apply valve further being in fluid communication with the torque converter clutch signal circuit, the improvements comprising:

an apply valve piston having at least one annular seal groove formed therein, said valve piston including an internal fluid gallery disposed in fluid communication with said seal groove and with the torque converter clutch signal circuit, said apply valve piston further including an expandable sealing means disposed within said seal groove, said seal being urged radially outward by fluid pressure delivered through said internal fluid gallery from the torque converter clutch signal circuit simultaneously with the application of the torque converter clutch.

19. An improved automatic transmission of claim 18 wherein said expandable sealing means comprises a ring-type seal having a rectangular cross-section being scarf cut at an oblique angle to the mid-circumferential plane thereof to permit radial expansion.

20. An improved automatic transmission of claim 18 wherein said internal fluid gallery comprises a longitudinally oriented fluid passage formed in fluid communication with at least one radially oriented fluid passage extending to said seal groove.

21. A method of restoring the hydraulic integrity of the torque converter clutch apply circuit within the valve body of an automatic transmission wherein a torque converter clutch apply valve is disposed in fluid communication with the torque converter clutch via the torque converter clutch apply circuit, and wherein the torque converter clutch apply valve is also in fluid communication with the torque converter clutch signal circuit, said method comprising the steps of:

removing the original equipment manufacture torque converter clutch valve piston from the valve body;

providing a replacement torque converter clutch valve piston having an annular seal groove formed therein in fluid communication with an internal fluid gallery formed within said valve piston;

installing an expandable sealing means within said seal groove; and positioning said replacement valve piston within the valve body such that said expandable sealing means is urged radially outward by fluid pressure delivered through the internal fluid gallery from the torque converter clutch signal circuit simultaneously with the actuation of the apply valve.

22. The method of claim 21 wherein the step of installing further includes the step of:

inserting said valve piston into the inside diameter of a ring-type seal having a rectangular cross-section and being scarf cut at an oblique angle to the mid-circumferential plane thereof to permit radial expansion; and sliding said seal to a position coincident with said seal groove.

* * * * *